US012630670B2

(12) United States Patent
Wang et al.

(10) Patent No.: US 12,630,670 B2
(45) Date of Patent: May 19, 2026

(54) FUSED RING MONOMERS PROVIDING FOR CHEMICALLY RECYCLABLE POLYMERS

(71) Applicants: Junpeng Wang, Peninsula, OH (US); Devavrat Sathe, Akron, OH (US)

(72) Inventors: Junpeng Wang, Peninsula, OH (US); Devavrat Sathe, Akron, OH (US)

(73) Assignee: The University of Akron, Akron, OH (US)

( * ) Notice: Subject to any disclaimer, the term of this patent is extended or adjusted under 35 U.S.C. 154(b) by 564 days.

(21) Appl. No.: 18/025,986

(22) PCT Filed: Sep. 13, 2021

(86) PCT No.: PCT/US2021/050044
§ 371 (c)(1),
(2) Date: Mar. 13, 2023

(87) PCT Pub. No.: WO2022/056367
PCT Pub. Date: Mar. 17, 2022

(65) Prior Publication Data

US 2023/0365743 A1 Nov. 16, 2023

Related U.S. Application Data

(60) Provisional application No. 63/076,988, filed on Sep. 11, 2020.

(51) Int. Cl.

| | |
|---|---|
| ***C08G 61/08*** | (2006.01) |
| ***C08J 11/16*** | (2006.01) |
| ***C08J 11/18*** | (2006.01) |

(52) U.S. Cl.
CPC ............... *C08G 61/08* (2013.01); *C08J 11/16* (2013.01); *C08J 11/18* (2013.01);
(Continued)

(58) Field of Classification Search
CPC .............. C08G 61/08; C08G 2261/418; C08G 2261/3322; C08G 2261/3321;
(Continued)

(56) References Cited

U.S. PATENT DOCUMENTS 3,597,403 A * 8/1971 Ofstead .................. C08G 61/08 502/154
5,905,129 A 5/1999 Murakami et al.
(Continued)

OTHER PUBLICATIONS

International Search Report and Written Opinion for International Patent Application No. PCT/US2021/050044 , mailed Dec. 27, 2021.
(Continued)

*Primary Examiner* — Fred M Teskin
(74) *Attorney, Agent, or Firm* — Renner, Kenner, Greive, Bobak Taylor & Weber

(57) ABSTRACT

A monomer capable forming a polymer through ring-opening metathesis polymerization and capable of depolymerization thereafter through ring-closing metathesis, wherein the monomer comprises a cycloalkene having a fused ring attached thereto which decreases the ring strain energy to 5.3 kcal/mol or lower as compared to the same cycloalkene without a fused ring having a ring strain energy above 5.3 kcal/mol.

19 Claims, 3 Drawing Sheets

(52) U.S. Cl.
CPC ................ *C08G 2261/3321* (2013.01); *C08G 2261/3322* (2013.01); *C08G 2261/418* (2013.01)

(58) Field of Classification Search
CPC .... C08G 2261/1426; C08J 11/10; C07C 2/50; C07C 13/32; C07C 2602/14
USPC .......................................................... 526/280
See application file for complete search history.

(56) References Cited

U.S. PATENT DOCUMENTS

| | | | |
|---|---|---|---|
| 6,525,144 B1 | 2/2003 | Tanahashi et al. | |
| 10,364,319 B2 | 7/2019 | Chen et al. | |
| 10,759,899 B2 | 9/2020 | Chen et al. | |
| 2005/0049418 A1* | 3/2005 | Hedrick | C07D 233/16 548/215 |

OTHER PUBLICATIONS

Lin et al. "On the Stereoselectivity of Ring-Opening Metathesis Polymerization (ROMP) of N-Arylpyrrolidine-Fused Cyclobutenes with Molybdenum-Ruthenium and-Alkylidene Catalyst" Macromolecules, vol. 46 Issue 18 (Sep. 11, 2013): pp. 7173-7179; abstract.

Huang et al. "Nickel-Catalyzed [2+2] Cycloaddition of Alkynes with Activated Cyclic Alkenes: Synthesis and Novel Ring Expansion Studies of Cyclobutene Products", Chemistry A European Journal, vol. 6 Issue 20 (Oct. 16, 2000): pp. 3706-3713; abstract; scheme 1.

Wang et al. "Olefin Metathesis-Based Chemically Recyclable Polymers Enabled by a Fused-Ring monomer" Research Square (Oct. 6, 2020): pp. 1-18; entire document.

Sathe et al. "Olefin metathesis-based chemically recyclable polymers enabled by fused-ring monomers" Nature Chemistry, vol. 13 (Jul. 22, 2021): pp. 743-750; entire document.

Chen et al. "Overcoming the Low Driving Force in Forming Depolymerizable Polymers through Monomer somerization" Angewandte Chemie International Edition, vol. 133 (pp. 2-8); entire document, (Sep. 9, 2021).

Lee et al. "Superior Cascade Ring-Opening/Ring-Closing Metathesis Polymerization and Multiple Olefin Metathesis Polymerization: Enhancing the Driving Force for Successful Polymerization of Challenging Monomers" Journal of American Chemical Society, vol. 140 Issue 33 (Jul. 31, 2018): pp. 10536-10545; entire document.

Hong et al. "Chemically recyclable polymers: a circular economy approach to sustainability". Green Chem.vol. 19 DOI: 10.1039/C7GC01496A, (Jun. 2017).

* cited by examiner

Non-substituted

*Trans*-CB

*Cis*-CB

Cyclooctenes 1,9-dienes

FUSED RING MONOMERS PROVIDING FOR CHEMICALLY RECYCLABLE POLYMERS

FIELD OF THE INVENTION

The invention relates to depolymerizable polymers, specifically the synthetic modification of nonrecyclable polymers through the addition of a fused ring. In particular embodiments, the invention relates to modification of cyclic olefins that polymerize through ring-opening metathesis polymerization, the modification providing a fused ring that decreases the ring strain energy (RSE) to an amount suitable for convenient depolymerization.

BACKGROUND OF THE INVENTION

Synthetic polymers, including synthetic rubber and synthetic plastics, have been used in nearly every aspect of our daily lives. The dominance of synthetic polymers is largely driven by their excellent stability and processability as well as their versatile mechanical properties. However, due to their high durability, waste materials composed of these polymers have accumulated in the ocean and have caused serious concerns for marine ecosystems. In addition, because 90% of these polymers are derived from finite fossil feedstocks, the production of these materials is unsustainable if they cannot be recycled and reused. Efforts to address these issues include the development of biodegradable polymers and mechanical recycling. However, most biodegradable polymers that can be degraded in artificial environments do not undergo efficient degradation in seawater, giving rise to new environmental consequences. Mechanical recycling of polymers typically results in substantial loss of quality, and the recycled material is not suitable for high-performance applications.

Thus, there is a need for chemically recyclable polymers that can depolymerize into their constituent monomers for recycling and repolymerization. Circular use of the materials not only will help to preserve finite natural resources but also can address end-of-life issues for such materials.

To replace currently available commercial polymers, depolymerizable polymers need to match or exceed the properties of the current ones. With exceptions, polymerization is typically favored in enthalpy ($\Delta H<0$) and disfavored in entropy ($\Delta S<0$). The temperature at which the entropic loss will offset the enthalpic gain is defined as the ceiling temperature $T_c$, and depolymerization is favored when the temperature is above $T_c$. Common polymers such as polyolefins have high $T_c$ values, and their depolymerization is either costly in terms of energy or is susceptible to decomposition. Classical low-$T_c$ polymers such as poly(olefin sulfones), poly(α-methyl styrene), and polyaldehydes lack high thermal and chemical stability, and their use has been limited to certain specific applications such as transient electronics.

A promising strategy to address the stability issues is to develop polymers that only undergo efficient depolymerization in the presence of a catalyst. In other words, without the catalyst, the polymer is in a kinetic trap so that it will stay intact even when the temperature is above $T_c$. Recently, it has been shown that ring-opening polymerization of certain cyclic monomers—such as cyclic esters, cyclic carbonates and cyclic olefins—can lead to polymers that can depolymerize into the corresponding monomers in the presence of catalysts but show high thermal stability when the catalysts are removed. For example, Chen and coworkers, Zhu, J.-B., Watson, E. M., Tang, J. & Chen, E. Y. X. A synthetic polymer system with repeatable chemical recyclability, *Science* 360, 398-403 (2018), have shown that a poly(γ-butyrolactone) required heating overnight at 300° C. to be depolymerized, but the depolymerization temperature was reduced to 120° C. when a $ZnCl_2$ catalyst was added.

Among catalytically depolymerizable polymers, ones that are formed through olefin metathesis are particularly attractive since olefin metathesis does not occur without a catalyst, and unintended depolymerization can thus be prevented by removing the catalyst. In addition, metathesis is compatible with a wide variety of functional groups and can be conducted in mild or ambient reaction conditions. Metathesis-based depolymerizable polymers are typically made via ring-opening metathesis polymerization (ROMP) of cycloalkenes and can depolymerize through ring-closing metathesis (RCM) to form the corresponding monomers. Compared to the ring-opening polymerization that is based on cyclic esters and cyclic carbonates, ROMP enables the production of polymers with hydrocarbon backbones, which have greater hydrolytic and thermal stability. However, up to now, demonstrations of depolymerizable ROMP polymers have been limited to polymers of five-membered cycloalkenes, namely the polypentenamers. As polypentenamers are typically amorphous polymers with glass transition temperatures ($T_g$) below or near room temperature, they are not suitable for plastics applications where glassy or semicrystalline polymers are needed. Furthermore, the controlled polymerization of cyclopentene is challenging: the reported cases of controlled polymerization of cyclopentene require that the conversion be limited to a low threshold (<20%) or that it be conducted in a variable-temperature fashion.

Other cyclic olefins including cyclopropene and cyclobutene are highly strained, with reported ring strain energies (RSEs) of 54.5 and 30.6 kcal $mol^{-1}$, respectively. Thus, depolymerization of their ROMP polymers is not feasible. Additionally, the ring strain of cyclohexene is too low to achieve a successful ROMP.

Accordingly, there is a need to discover new and more robust depolymerizable ROMP polymers, specifically other cyclic olefins. Ideally, such depolymerizable ROMP polymers exhibit excellent thermal stability and tunable mechanical properties. Additionally, such depolymerizable ROMP polymers are made from inexpensive and commercially available materials.

SUMMARY OF THE INVENTION

An embodiment of the present invention provides a monomer capable of forming a polymer through ring-opening metathesis polymerization and capable of depolymerization thereafter through ring-closing metathesis, wherein the monomer is a cycloalkene having a fused ring attached thereto which decreases the ring strain energy to 5.3 kcal/mol or lower as compared to the same cycloalkene without a fused ring having a ring strain energy above 5.3 kcal/mol.

Another embodiment of the present invention provides a monomer as in any embodiment above, wherein the cycloalkene is a 7- to 12-membered cycloalkene.

Another embodiment of the present invention provides a monomer as in any embodiment above, wherein the fused ring is either cis-fused or trans-fused.

Another embodiment of the present invention provides a monomer as in any embodiment above, wherein the cycloalkene is an 8-membered cycloalkene, cyclooctene.

Another embodiment of the present invention provides a monomer as in any embodiment above, wherein the fused ring is a 3- to 6-membered ring.

Another embodiment of the present invention provides a monomer as in any embodiment above, wherein the fused ring is a 4-membered ring, cyclobutane.

Another embodiment of the present invention provides a monomer as in any embodiment above, wherein the fused ring is a 5-membered ring, cyclopentane.

Another embodiment of the present invention provides a monomer as in any embodiment above, wherein the fused ring is fused at the C5, C6-positions of the cyclooctene.

Another embodiment of the present invention provides a monomer as in any embodiment above, wherein the fused ring is trans-cyclobutane or trans-cyclopentane.

An additional embodiment of the present invention provides a monomer capable forming a polymer through ring-opening metathesis polymerization and capable of depolymerization thereafter through ring-closing metathesis, wherein a cycloalkene having a fused ring attached thereto wherein the attachment of the fused ring results in a change of less than 1° of an average difference in dihedral angles, measured at the attachment of the fused ring, from the acyclic diene to cycloalkane-fused cycloalkene.

Another embodiment of the present invention provides a monomer as in any embodiment above, wherein the cycloalkene is a 7- to 12-membered cycloalkene.

Another embodiment of the present invention provides a monomer as in any embodiment above, wherein the fused ring is either cis-fused or trans-fused.

Another embodiment of the present invention provides a monomer as in any embodiment above, wherein the cycloalkene is an 8-membered cycloalkene, cyclooctene.

Another embodiment of the present invention provides a monomer as in any embodiment above, wherein the fused ring is a 3- to 6-membered ring.

Another embodiment of the present invention provides a monomer as in any embodiment above, wherein the fused ring is a 4-membered ring, cyclobutane.

Another embodiment of the present invention provides a monomer as in any embodiment above, wherein the fused ring is a 5-membered ring, cyclopentane.

Another embodiment of the present invention provides a monomer as in any embodiment above, wherein the fused ring is fused at the C5, C6-positions of the cyclooctene.

Another embodiment of the present invention provides a monomer as in any embodiment above, wherein the fused ring is trans-cyclobutane or trans-cyclopentane.

An additional embodiment of the present invention provides a method of synthesizing a monomer capable forming a polymer through ring-opening metathesis polymerization and capable of depolymerization thereafter through ring-closing metathesis, wherein a cyclic diene is provided, and wherein a photochemical 2+2 cycloaddition with an olefin is performed.

Another embodiment of the present invention provides a method as in any embodiment above, wherein the olefin is maleic anhydride, the maleic anhydride is converted to a monomer by one of the following converting the maleic anhydride to a monomer by performing one of the following: providing $LiAlH_4$ and THF to the maleic anhydride, to thereby form monomer M1; providing MeOH reflux, MeOH, EDC, DMAP, and DCM, to the maleic anhydride, to thereby form monomer M2a; providing NaOH, $H_2O$, 1-butanol, EDC, DMAP, and DCM at 60° C., to the maleic anhydride, to thereby form monomer M2b; providing $LiAlH_4$ THF, NaH, MeI, THF, to the maleic anhydride, to thereby form monomer M3; and providing aniline, acetone, sodium acetate, and acetic anhydride at 100° C., to the maleic anhydride to thereby form monomer M4

DETAILED DESCRIPTION OF ILLUSTRATIVE EMBODIMENTS

Figure 1:
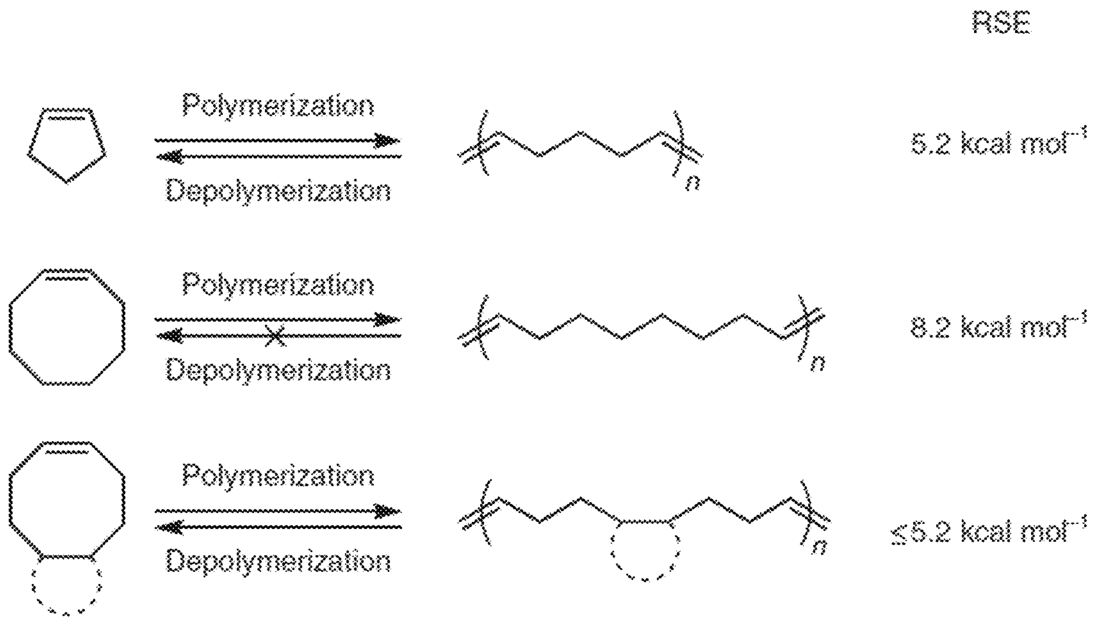
FIG. 1 provides a general schematic representation of the lowering of ring strain energy (RSE) of a cylcloalkene to permit polymerization and depolymerization.

An objective of the present invention is to provide olefin metathesis-based chemically recyclable polymers enabled by fused-ring monomers. Ideally, cyclic monomers according to the present invention would have ring strain energies, RSEs, comparable to that of cyclopentene. The cyclic monomers according to the present invention may be polymerized through ring opening metathesis polymerization, and depolymerized through ring closing metathesis during recycling, which is readily favored when the RSE of the cyclic monomer is comparable to that of cyclopentene.

Chemically recyclable polymers of the present invention are formed through ring-opening metathesis of monomers wherein a fused ring is attached to a cycloalkene. The addition of the fused ring allows the polymer to be depolymerizable by reducing the RSE in the cycloalkene monomers from a value greater than 5.3 kcal $mol^{-1}$ (without fused ring) to a value equal to or lower than 5.3 kcal $mol^{-1}$ (with fused ring).

Additionally, a broad scope of functionalities can be incorporated into the cycloalkene monomers with a fused-ring.

In some embodiments, the cycloalkenes that are modified with the fused rings include 7- to 12-membered rings. In some embodiments the cycloalkene is based on cycloheptene (7-membered ring). In some embodiments the cycloalkene is based on cyclooctene (8-membered ring). In some embodiments the cyclic olefin is based on cyclononene (9-membered ring). In some embodiments the cyclic olefin based on cylcodecene (10-membered ring). In some embodiments the cyclic olefin is based on cycloundecene (11-membered ring). In some embodiments the cyclic olefin is based on cycloduodecene (12-membered ring).

An 8-membered cyclic olefin is particularly attractive because functionalized cyclooctenes can typically be made from 1,5-cyclooctadiene, an inexpensive, commercially available starting material. As a result, polycyclooctene is one of the most extensively exploited polycycloalkenes.

In some embodiments the fused ring is a cycloalkane. Suitable fused rings for the present invention include 3-member to 6-membered fused rings. In some embodiments the fused ring is cyclopentane. In some embodiments the fused ring is cyclopentane. In some embodiments the fused ring is cyclopentane. In some embodiments the fused ring is cyclopentane. In some embodiments the fused ring is cyclohexane.

In some embodiments the fused ring is cis-fused or trans-fused. In some embodiments the fused ring is cis-fused. In some embodiments the fused ring is trans-fused.

In some embodiments, the fused ring is at least 2 carbon atoms removed from the double bond. In other embodiments, the fused ring is opposite the double bond or as closely opposite as possible for odd-membered rings. In some embodiments with a 7-membered cycloalkene, the fused ring is at the 3 and 4 position or the 4 and 5 position. In some embodiments with an 8-membered cycloalkene, the fused ring is at the 5 and 6 position. In some embodiments with a 9-membered cycloalkene, the fused ring is at the 5 and 6 position or the 6 and 7 position. In some embodiments with a 10-membered cycloalkene, the fused ring is at the 6 and 7 position. In some embodiments with an 11-membered cycloalkene, the fused ring is at the 6 and 7 position or the 7 and 8 position. In some embodiments with a 12-membered cycloalkene, the fused ring is at the 7 and 8 position.

In some embodiments, the fused rings are functionalized. Functionality may be selected to alter thermomechanical properties of the resulting polymer. Examples of such thermomechanical properties include $T_d$ and $T_g$ which may be increased or decreased according to the functionality included on the fused ring. Generally, cyclic functional groups exhibit higher $T_g$ than acyclic function groups. Additionally, longer alkyl chains provide polymers with a lower $T_g$ than shorter alkyl chains.

Suitable cycloalkenes for the present invention can be identified by the generalized ring-closing metathesis reaction used to calculate the RSE of a cyclic olefin; the RSE for the cyclic olefin is essentially the enthalpy change for the ring-closing metathesis that affords the cyclic olefin, as shown in the exemplary scheme below.

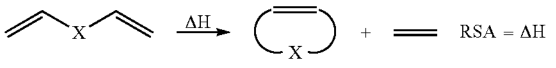

In accordance with this invention, the addition of the fused ring serves to reduce the RSE in the cycloalkene monomers from a value greater than 5.3 kcal $mol^{-1}$, without the fused ring, to a value equal to or lower than 5.3 kcal $mol^{-1}$, with the fused ring. To identify a fused ring that can lower the ring strain of cyclooctene to the above-mentioned target, the RSEs of cyclooctenes with three-, four-, five- and six-membered rings fused at the 5 and 6 positions, including both cis and trans isomers, were calculated. The computation of RSE was conducted by calculating the enthalpy change of the RCM reaction using density functional theory at the B3LYP/6-31G(d,p) level, which provided reasonable predictions for the RSEs of cyclic olefins.

As shown in FIG. 1, polycyclopentene is depolymerizable, whereas polycyclooctene is not. The difference is caused by a higher RSE in cyclooctene. An appropriate ring (shown as a dashed line in FIG. 1) is provided in accordance with this invention to lower the RSE of cyclooctene to a level that is lower than or comparable to that of cyclopentene, enabling depolymerization of the polymer.

Figure 2:
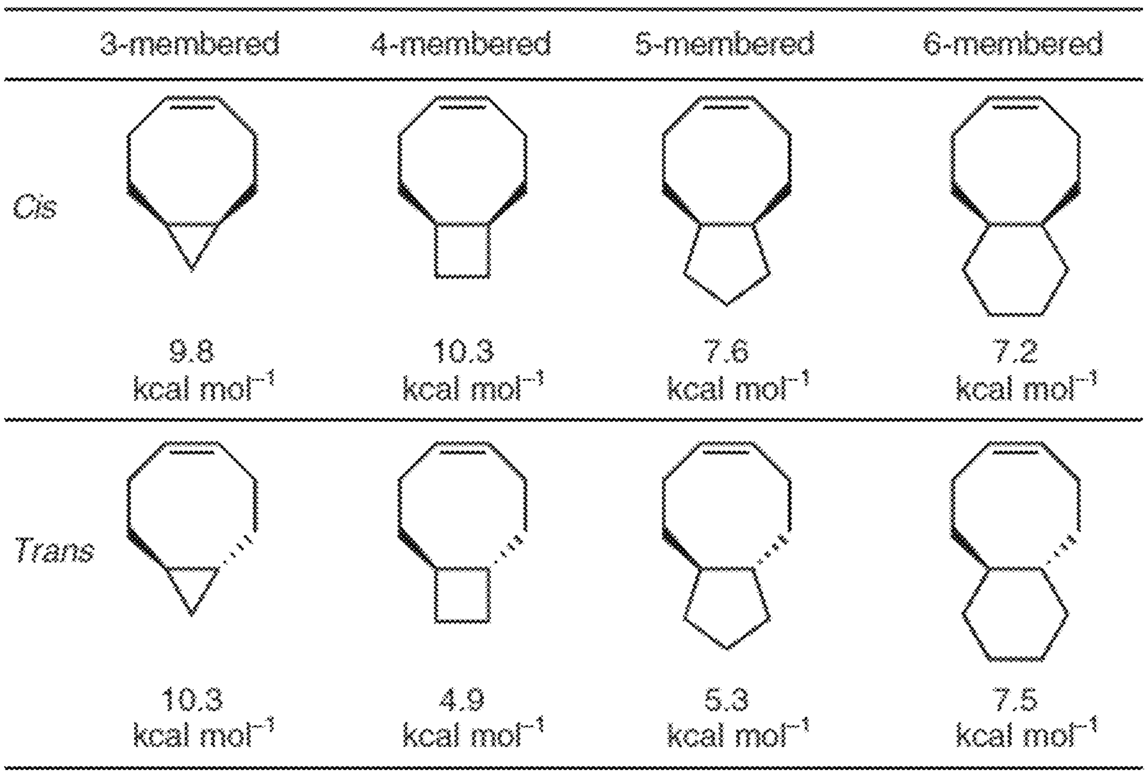
FIG. 2 provides a table showing structures and calculated RSEs for cyclooctene with 3-, 4-, 5- and 6-membered rings both cis- and trans-fused at the 5 and 6 positions.

By way of example, the calculated RSEs for cyclooctene with 3-, 4-, 5- and 6-membered rings both cis- and trans-fused at the 5 and 6 positions are shown in FIG. 2.

Based on the difference in RSE between the fused rings and the unsubstituted cyclooctene (RSE=8.2 kcal $mol^{-1}$), the calculated results can be sorted into three groups:

1. RSEs that are higher than that of the virgin cyclooctene, including cis-cyclopropane-, trans-cyclopropane- and ciscyclobutane-fused cyclooctenes
2. Fused rings with slightly decreased ring strain, including cis-cyclopentane-, cis-cyclohexane- and trans-cyclohexanefused cyclooctenes
3. Cycloalkane-fused cyclooctenes having the lowest RSEs and having RSEs that are lower than or comparable to that of cyclopentene (RSE=5.2 kcal $mol^{-1}$), including trans-cyclobutane and trans-cyclopentane-fused cyclooctenes The calculated RSEs of the ROMP polymers of the trans-cyclobutane-fused cyclooctenes and trans-cyclopentane-fused cyclooctenes indicate that the obtained polymers from these monomers are suitable for catalytic depolymerization in a way similar to polypentenamers.

Experimental Results

Cycloalkane-fused cyclooctenes were deployed for the experimental and control studies because of the synthetic convenience of accessing cyclobutane- and cyclopropane-fused cyclooctenes from 1,5-cyclooctadiene.

Monomer Synthesis

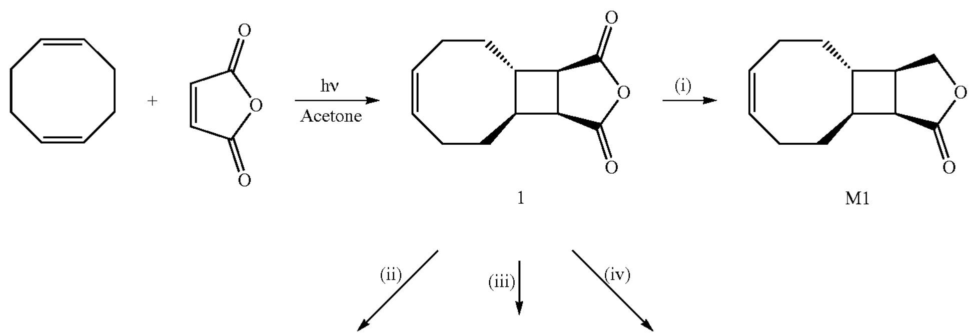

-continued

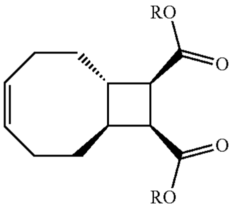

M2a, R = Me; M2b, R = $^{n}$Bu

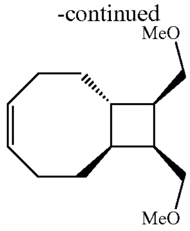

M3

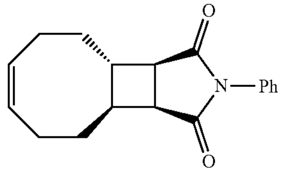

M4

M1 was synthesized through a photochemical [2+2] cycloaddition of 1,5-cyclooctadiene and maleic anhydride followed by $LiAlH_4$ reduction. Note that the cyclobutane in M1 is trans-fused to the cyclooctene, indicating a cis-to-trans isomerization of the alkene prior to cycloaddition. Similar inversion of stereochemistry has been observed in other systems. Importantly, the moiety of trans-cyclobutane-fused cyclooctene (tCBCO) is exactly the target moiety. Aside from lactone, tCBCOs with other functional groups—including the diesters M2a and M2b, the diether M3 and the imide M4—were conveniently derived from the intermediate anhydride 1.

According to the scheme above, the intermediate anhydride 1 can be readily converted to M1, M2, M3 and M4 through conditions (i), (ii), (iii) and (iv), respectively. (i) 0.5 equiv. $LiAlH_4$, THF. (ii) M2a: MeOH, reflux; MeOH, EDC, DMAP, DCM. M2b: NaOH, $H_2O$, 60° C.; 1-butanol, EDC, DMAP, DCM. (iii) 1.0 equiv. $LiAlH_4$, THF; NaH, Mel, THF. (iv) Aniline, acetone; sodium acetate, acetic anhydride, 100° C.

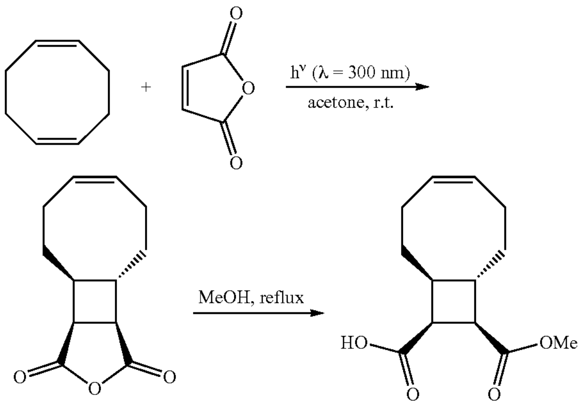

1 2

Synthesis of Ester-Acid 2 was performed according to the following procedure: To a quartz flask equipped with a stir bar, a solution of maleic anhydride (5.4 g, 55.1 mmol, 1 eq.) and cyclooctadiene (6.55 g, 61 mmol, 1.1 eq.) in acetone (150 mL) was added. The solution was sparged with nitrogen for ~30 min. followed by irradiation with 300 nm UV light in a Rayonet photoreaction chamber for 14 h. The mixture was then concentrated on a rotavap and the intermediate 1 was used without purification for the next step. The mixture that contains 1 was suspended in methanol (150 mL), and the mixture was refluxed for 3.5 h. The mixture was filtered and the filtrate was concentrated by solvent evaporation using a rotavap and purified by column chromatography (3:7 ethyl acetate (EA)/hexane as eluent), followed by recrystallisation from an EA-hexane solution to yield methyl ester 2 as a white crystalline powder.

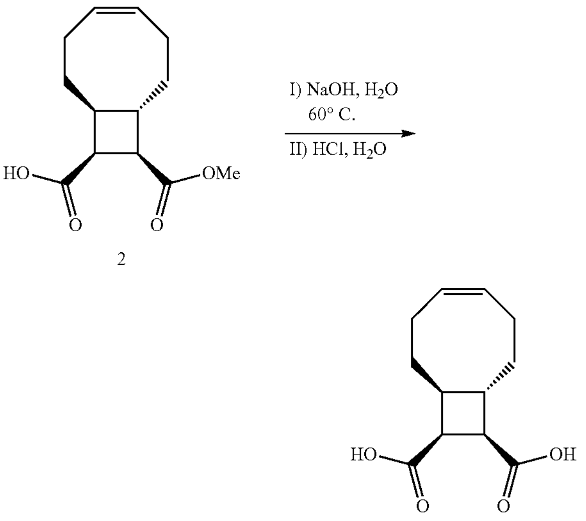

2

3

Synthesis of Diacid 3 was performed according to the following procedure: To a 50 mL round-bottom flask equipped with a stir bar, a solution of NaOH (1.68 g, 42 mmol, 16.7 eq.) in D.I. water (20 mL) was added. To the NaOH solution was added 600 mg of methyl ester-acid 2 (600 mg, 2.52 mmol, 1 eq.). The reaction was placed in an oil bath at 60° C. overnight (~14 h). The reaction mixture was then placed in an ice bath and neutralized with 3 N HCl. The aqueous phase was extracted with EA and the extraction was dried over Na2SO4, and filtered, followed by removal of solvent on a rotavap. The diacid 3 was obtained as a white powder.

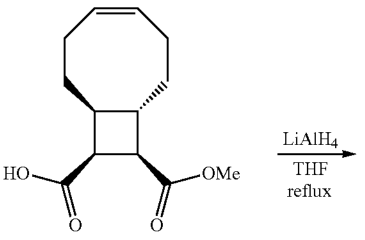

2

-continued

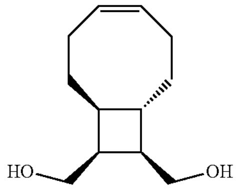

4

Synthesis of tCBCO diol 4 was performed according to the following procedure: A suspension of $LiAlH_4$ (2.17 g, 57.07 mmol, 6.8 equ.) in dry THF (20 mL) was cooled in an ice bath. To the solution was added a solution of acid-ester 2 (2.00 g, 8.39 mmol, 1 equ) in dry THF (80 mL) dropwise. After stirring at 0° C. for 30 min, the reaction mixture was heated to reflux and left reflux overnight. The reaction mixture was cooled to 0° C., and quenched by adding 2.2 mL H2O, followed by addition of 2.2 mL 15% aqueous NaOH and 2.2 mL H2O. The suspension was filtered through Celite and the filtrate was concentrated at reduced pressure. The resulting crude product was purified via column chromatography to afford diol 4 as a white solid (yield: 97.5%).

Synthesis of M2a was performed according to the following procedure: To a round-bottom flask equipped with a stir bar, methyl ester-acid 2 (600 mg, 2.52 mmol, 1 eq.), DMAP (61 mg, 0.5 mmol, 0.2 eq.), methanol (0.161 mg, 5.04 mmol, 2 eq.) and dry DCM (25 mL) were added. The solution was cooled over an ice bath and EDC (966 mg, 5.04 mmol, 2 eq.) was added. The mixture was allowed to warm to room temperature and stir overnight. The reaction mixture was then diluted with more DCM and washed with brine, dried over Na2SO4, filtered, and concentrated by solvent evaporation on a rotavap. The crude product mixture was purified via column chromatography, using a 1:4 EA/hexane mixture as eluent. After solvent removal, the product M2a was obtained as a white solid (509 mg, yield: 80%).

Synthesis of M2b was performed according to the following procedure: To a round-bottom flask equipped with a stir bar, diacid 3 (941 mg, 4.20 mmol, 1 eq.), DMAP (205.5 mg, 1.68 mmol, 0.4 eq.), butanol (684.9 mg, 9.24 mmol, 2.2 eq.) and dry DCM (60 mL) were added. The solution was cooled over an ice bath and EDC (3220.6 mg, 16.8 mmol, 4 eq.) was added. The mixture was allowed to warm to room temperature and stir overnight. The reaction mixture was then diluted with more DCM and washed with brine, dried over Na2SO4, filtered, and concentrated by solvent evaporation on a rotavap. The crude product mixture was purified via column chromatography, using a 1:9 EA/hexane mixture as eluent. After solvent removal, the product M2b was obtained as a clear, colourless oil. Yield: 540 mg (~38.3%).

Synthesis of M3 was performed according to the following procedure: To a solution of diol 4 (100.0 mg, 0.51 mmol, 1 eq.) in 5 mL THF was added sodium hydride (37.0 mg, 1.53 mmol, 3 eq.) at 0° C. After stirring for 3 h, iodomethane (95 μL, 1.53 mmol, 3 eq.) was added and the reaction was stirred at room temperature for 1 h. 20/80 MeOH/H2O was then added to quench the reaction and the mixture was extracted with DCM. The organic phase was washed with brine and dried over sodium sulfate. The crude product was purified via column chromatography (15% EA/hexane) to afford 96 mg M3 as a clear, colourless liquid (yield: 84%).

Synthesis of M1 was performed according to the following procedure: Since 1 obtained directly from photochemical [2+2] cycloaddition is difficult to purify, a purer 1 was obtained from the diacid 3. This practice was found to ease the purification for the synthesis of M4. In a flask charged with diacid 3 (2.00 g, 8.92 mmol) was added acetic anhydride (20 mL) and refluxed overnight. Acetic anhydride was removed via vacuum distillation to afford the white solid anhydride 1. The anhydride was used without further purification. Anhydride 1 was dissolved in acetone (8 mL), and aniline (1.63 mL, 17.84 mmol, 2.0 eq.) was added dropwise to the solution. White precipitate formed gradually, and the mixture became mud-like after 1 h. The reaction was allowed to proceed for another 2 h before suction filtration. The solid was washed with acetone and dried under vacuum, affording the amic acid as a white solid (2.50 g). The amic acid was added to a mixture of sodium acetate (1.10 g, 13.38 mmol, 1.5 eq.) and acetic anhydride (15 mL). The suspension was heated overnight at 100° C. and became clear gradually. The mixture was poured into ice water, and the resulting precipitate was collected through suction filtration. The solid was further washed with water, dissolved in DCM and dried over sodium sulfate. The crude product was purified via column chromatography using DCM. The product was further purified through recrystallisation in toluene, affording the imide monomer M4 as white crystals (1.2 g, overall yield: 47.6%).

Synthesis of E-M2a was performed according to the following procedure Photoisomerization was performed based on a reported method1. In a quartz flask was added diester monomer M2a (504 mg, 2.00 mmol, 1.0 eq.), diethyl ether (50 mL), methyl benzoate (655 μL, 5.20 mmol, 2.6 eq.) and hexane (50 mL). The solution was circulated through a column with 10% AgNO3-impregnated silica gel (680 mg AgNO3, 4.00 mmol, 2.0 eq.) while irradiation of the flask for 14 hours with 8 RPR-2537A lamps in a Rayonet photoreaction chamber. 500 mL diethyl ether was used to wash the AgNO3 column. The silica gel was then poured into a mixture of 200 mL ammonium hydroxide and 300 mL DCM and stirred vigorously for 30 min. The aqueous phase was extracted with DCM, and the combined organic phase was washed with brine and dried over sodium sulfate. The crude product was purified via column chromatography (Et2O/hex=30%), and the obtained product was further purified via preparatory GPC to afford E-M2a as a colourless oil (65 mg, yield: 13%).

Polymerization Thermodynamics

A high monomer concentration was found to be essential for the ROMP of these monomers, as low monomer concentrations resulted in low conversions. In addition, the conversion was also influenced by the temperature. For example, a xylene solution of 1.0 M M2a with 1.0 mol % Grubbs' second-generation catalyst (G2) resulted in 67% conversion when the reaction reached equilibrium at 19° C. The equilibrium conversion was lowered to 53% when the reaction temperature was raised to 65° C. Thermodynamic data was obtained from the conversions of the polymerization conducted at various temperatures for M2a at 1.0 M: $\Delta H=-1.7$ kcal $mol^{-1}$ and $\Delta S=-3.6$ cal $mol^{-1}$ $K^{-1}$. Similarly, the ΔH (1.0 M) and ΔS (1.0 M) for M4 obtained were −2.8 kcal $mol^{-1}$ and −4.9 cal $mol^{-1}$ $K^{-1}$, respectively. While the experimental enthalpy changes confirmed the predicted low RSEs for these monomers, the experimental values are ~2-3 kcal $mol^{-1}$ lower than the calculated ones (which are 5.0 kcal $mol^{-1}$ and 5.1 kcal $mol^{-1}$ for M2a and M4, respectively). The discrepancy could be due to the presence of a small fraction of cyclic oligomers in the polymerization mixture, as evidenced by gel permeation chromatography and mass spectrometry, while the RSEs were calculated solely using the energies of the acyclic diene. In addition, the entropy changes for these monomers are substantially lower than that for cyclopentene ($\Delta S=-18.5$ cal $mol^{-1}$ $K^{-1}$). The reduced entropy change can be attributed to the lower loss in translational entropy for the larger-sized monomers and the higher gain in rotational entropy due to the higher number of freed bonds in the eight-membered ring that were attained through the ring-opening reaction. Compared to cyclopentene, the lower entropy loss for the polymerization of tCBCO monomers compensates the lower enthalpy gain and makes the polymerization favorable at high monomer concentrations. For example, at 25° C. and 1.0 M concentration, the Gibbs free energy values ($\Delta G$) for polymerization of M2a and M4 are −0.63 kcal $mol^{-1}$ and −1.33 kcal $mol^{-1}$, respectively, which are more favorable than that for cyclopentene ($\Delta G=-0.087$ kcal $mol^{-1}$). The ceiling temperatures for P2a, P4 and polypentenamer at 1.0 M are 199° C., 295° C. and 30° C., respectively. In addition, many functional groups on the 3 position of cyclopentene could reduce the ceiling temperature to values below room temperature, making the monomers challenging to polymerize18. Compared to polypentenamer, the favourable ceiling temperatures of the tCBCO system can enable the preparation of tCBCO polymers of a variety of functionalities through ROMP.

Polymer Synthesis

The monomers were subjected to ROMP conditions with ~2 M monomer concentration in dichloromethane and G2 as the initiator, yielding the polymers P1, P2a, P2b, P3 and P4 at high conversions, as shown below. The number average molecular weight Mn, dispersity Đ, glass transition temperature $T_g$ and decomposition temperature $T_d$ (defined as the temperature at which 5% weight loss occurs) for each polymer are shown in Table 2. Polymers with high molecular weights ($M_n$>100 kDa) were obtained for all polymers. The high dispersities (Đ>1.5) are comparable to those for other ROMP polymers of low-strain monomers. As stated above, an advantage of the eight-membered cycloalkene is that the cis-alkene can be inverted to a trans-alkene, which is highly strained and is suitable for living ROMP. M2a was converted into E-M2a through photoisomerization by following the protocol demonstrated by Fox and coworkers, Royzen, M., Yap, G. P. A. & Fox, J. M. A photochemical synthesis of functionalized trans-cyclooctenes driven by metal complexation. *J. Am. Chem. Soc.* 130, 3760-3761 (2008), which is incorporated herein by reference. A controlled ROMP was conducted by employing the conditions developed by Grubbs and coworkers, Walker, R., Conrad, R. M. & Grubbs, R. H. The living ROMP of trans-cyclooctene. *Macromolecules* 42, 599-605 (2009), which is incorporated herein by reference, where Grubbs' first-generation catalyst (G1) and excess triphenylphosphine were used. P2a' with high molecular weight and low dispersity ($M_n$=94.7 kDa, Đ=1.23) was obtained at high conversion (>95%) even when the ROMP was conducted at a monomer concentration of 0.25 M.

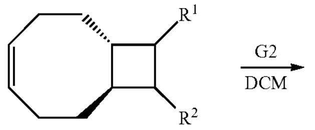

MX

-continued

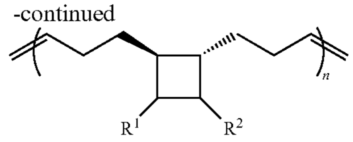

PX

TABLE 2

| | $M_n$ (kDa) | Đ | $T_d$ (° C.) | $T_g$ (° C.) |
|---|---|---|---|---|
| P1 | 105 | 1.42 | 430 | 49 |
| P2a | 142 | 1.55 | 401 | 18 |
| P2b | 124 | 1.93 | 370 | −31 |
| P3 | 293 | 1.91 | 372 | −34 |
| P4 | 198 | 1.96 | 409 | 100 |

Synthesis of P2a was performed according to the following procedure: M2a (459 mg, 1.82 mmol, 1 eq.) was dissolved in DCM (400 μL) in a 11 mL glass vial. To the solution was added 59 μL of a stock solution G2 (concentration: 52.37 mg/mL) in DCM (3.09 mg, 0.00364 mmol, 0.002 eq.). The mixture was allowed to stir for 6 h at room temperature. The polymerization was quenched by adding ethyl vinyl ether (~300 μL) and stirred for ~30 min. Quadrapure TU macroporous particles (350 mg) and DCM (5 mL) were then added. The mixture was stirred overnight, filtered through a Celite plug and concentrated on a rotavap. The polymer was precipitated twice in cold methanol to afford P2a as a white solid, which was dried on a vacuum line.

Synthesis of P2b was performed according to the following procedure: In an 11 mL vial were added M2b (55.4 mg, 0.16 mmol, 1 eq.) and G2 stock solution (50 μL, 5.1 mg/mL in DCM, 0.255 mg, 0.0003 mmol, 0.0019 eq.). The mixture was allowed to stir for 4h at room temperature and was then quenched by addition of ethyl vinyl ether (~100 μL). After stirring for ~30 min, Quadrapure TU macroporous particles (50 mg) and DCM (0.5 mL) were added. The mixture was further stirred overnight, filtered through a Celite plug and concentrated on a rotavap. It was then precipitated twice in cold methanol and dried on a vacuum line to yield a colourless viscous solid.

Synthesis of P3 was performed according to the following procedure: In a 11 mL vial were added M3 (54.3 mg, 0.242 mmol, 1 eq.) and 54.3 μL of a DCM stock solution of G2 (0.41 mg, 0.000484 mmol, 0.002 eq.). After stirring for 6 h, the reaction was quenched with 100 μL ethyl vinyl ether. After stirring for another 30 minutes, Quadrapure TU macroporous particles (50 mg) and DCM (1 mL) were added, and the mixture was stirred overnight. The mixture was filtered through a Celite plug, and the filtrate was concentrated on a rotavap. The polymer was precipitated in cold methanol twice to afford P3.

Synthesis of P4 was performed according to the following procedure: In an 11 mL vial, M4 (103.0 mg, 0.37 mmol, 1.0 eq.) was dissolved in 170 μL DCM. G2 (0.31 mg, 0.37 μmol, 0.001 eq.) in 13 μL DCM (from a stock solution) was added while stirring. The reaction was stirred for 1.5 h, before ethyl vinyl ether (0.5 mL, 5.26 mmol) and THF (0.5 mL) was added, and the mixture was left to stir for 30 min. QuadraPure TU microporous particles (50.0 mg) was then added to remove residual ruthenium in the polymer. The mixture filtered through a Celite plug, and the filtrate was then concentrated and precipitated three times in cold methanol, yielding a white solid, which was collected and dried under vacuum overnight to afford P4.

Synthesis of P2a' (via controlled ROMP of E-M2a) was performed according to the following procedure: A reaction flask was treated with 10% Me2SiCl2 toluene solution for 1 h, rinsed with toluene and dried in an oven overnight. To the flask were added E-M2a (21.0 mg, 83.3 μmol, 1.0 eq.), recrystallised PPh3 (2.6 mg, 9.99 μmol, 0.12 eq.) and dry THF (320 μL). Grubbs' 1$^{st}$ generation catalyst (G1) (0.14 mg, 0.167 μmol, 0.002 eq.) in 13 μL dry THF (from a stock solution) was added while vigorous stirring. After stirring for 10 min under N2, ethyl vinyl ether (0.2 mL, 2.1 mmol) was added, and the mixture was allowed to stir for 30 min. A suspension of QuadraPure TU macroporous particles (50 mg) in THF (0.5 mL) was then added to remove residual ruthenium in the polymer. The mixture was then filtered through a Celite plug to collect the filtrate and THF was removed by rotary evaporation.

Polymerization Thermodynamics

To determine the time required for polymerization of monomers M2a and M4 to reach equilibrium, the polymerization was carried out at two different temperatures (19° C. and 35° C.) and both cases were monitored via $^1$H NMR. The following procedure is a representative example of the polymerizations carried out here:

Synthesis of P1 was performed according to the following procedure: M2a (252.3 mg, 1 mmol, 1 eq.) was dissolved in xylene (0.5 mL) in a 1 mL volumetric flask, and additional xylene was added to reach the 1 mL mark. The solution was added to a 1 dram vial with a stir bar and placed in a preheated oil bath at 35° C. The temperature of the vial was allowed to equilibrate with the oil bath while stirring for 20-30 minutes, after which Grubbs second-generation catalyst G2 (8.5 mg, 0.01 mmol, 0.01 eq.) was added, and a stopwatch was started. Aliquots of 100 μL were withdrawn at different intervals and added to a vial with EVE (100 μL) which was also heated in an oil bath for —1-2 min prior to addition of the aliquot. CDC13 (700 μL) was added to each aliquot and NMR spectra were obtained to determine monomer conversion.

Depolymerization Studies

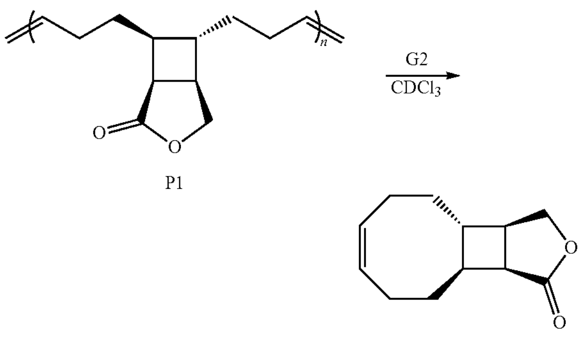

P1

M1

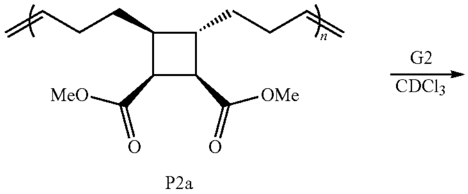

P2a

-continued

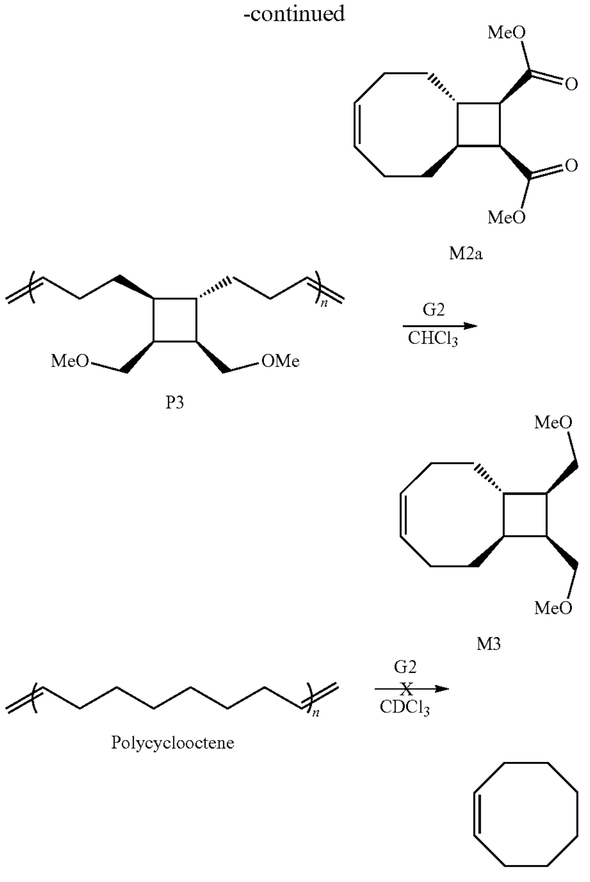

M2a

P3

M3

Polycyclooctene

Cyclooctene

To test the capability of depolymerization, the polymers were dissolved in chloroform ($CHCl_3$) or deuterated chloroform ($CDCl_3$) at a concentration of 25 mM ([olefin]=25 mM) and heated at 50° C. in the presence of 1 mol % G2 for 2 h. The tCBCO polymers all underwent >90% depolymerization to form the corresponding monomers, as supported by observations obtained via proton nuclear magnetic resonance, GPC, and MS. In addition, monomer M2a, which was isolated from the depolymerization mixture of P2a, was subjected to the ROMP conditions described above and yielded polymers of high molecular weight ($M_n$=71 kDa, Đ=1.53). By contrast, when exposed to the same conditions, polycyclooctene did not depolymerize into cyclooctene despite a reduction in molecular weight. Moreover, the ROMP polymers of both cis- and trans-cyclopropane-fused cyclooctenes at the 5 and 6 positions (cis-gDCC-CO and trans-gDCC-CO, respectively) did not depolymerize into the corresponding monomers, which is consistent with the high RSEs of these monomers. In addition, a 1,9-decadiene with trans-cyclobutane installed at its 5 and 6 positions underwent RCM at quantitative conversion to form tCBCO when it was refluxed in the presence of G2. By contrast, when the cis-cyclobutane diene was subjected to the same conditions, no cis-cyclobutane-fused cyclooctene was observed in the mass spectrum, which instead showed a mixture of acyclic and cyclic oligomers. The depolymerization and RCM studies confirm the computational results that trans-cyclobutane appreciably reduces the RSE of cyclooctene and highlight the impact of the size and stereochemistry of the fused ring on the RSE of a cyclic molecule.

The depolymerization conditions, including temperature and concentration, were screened in order to understand the thermodynamics and to identify the optimal conditions for depolymerization. Conversions of 94-98% were obtained when the depolymerization of P2a was conducted at concentrations of [olefin]≤200 mM at 50° C. In particular, the concentration of 200 mM corresponds to a weight concentration of 5% (w/w), meaning that 5 g of polymers can be depolymerized using 100 ml of solvent, which adds to the practicality of the chemical recycling. The conversion of depolymerization became more sensitive to concentration at [olefin]≥200 mM. For example, the conversions dropped to 84% and 66%, respectively, when the concentrations increased to 400 mM and 600 mM. Temperature plays a lesser role in determining the final conversion of the depolymerization. For example, the depolymerization conversions at 50° C. for [olefin]=100 mM and 400 mM were 97% and 84%, respectively, and the corresponding values at 19° C. were 94% and 85%. The insensitivity to temperature of the equilibrium depolymerization conversion is consistent with the low entropy change of the reaction, as discussed above.

To understand the depolymerization process, depolymerization of P2a was conducted at three different temperatures (50° C., 45° C. and 19° C.) and was monitored with $^1$H NMR and GPC. The GPC traces suggest that both the monomer, retention time, 19.7-21.5 min, and oligomers, retention time, 17.7-19.7 min, formed during depolymerization. The formation of oligomers during depolymerization is also supported by MS characterization. The fraction of the oligomers was obtained from the integration of the GPC refractive index (RI) traces. When the depolymerization was conducted at 50° C., no residual polymer peak was observed after 3 min. This rapid depolymerization makes it inconvenient to obtain sufficient data points for kinetic studies. The time after which no residual polymer was observed was 10 min at 45° C. and 120 min at 19° C., which allowed sufficient data points to be obtained for kinetic analysis. The fractions of monomer, oligomers and residual polymer were plotted against depolymerization time for depolymerization at 45° C. and 19° C. As shown in the plots, the polymer fraction continuously decreased while the monomer fraction continuously increased throughout depolymerization. However, the fraction of oligomers first increased and reached a maximum in the range of ~30-40% before starting to decrease. Most of the oligomers eventually turned into the monomer. For example, no residual polymer was observed for the depolymerization of P2a at 45° C. at 10 min; at that time, the fractions of monomer and oligomer were 80% and 20%, respectively. The oligomers continued to convert into monomer until an equilibrium was reached at around 20 min. The equilibrium fractions for monomer and oligomers were 93% and 7%, respectively. In addition, when the depolymerization was conducted at 19° C., the fractions of the oligomers were higher than those of the monomer at the early stage of depolymerization (0-30 min). These results suggest that while the monomer is the thermodynamic products, the formation of the oligomers is kinetically more favourable. The formation of cyclic oligomers was not observed for the depolymerization of polypentenamers. This difference can be attributed to the difference between the RSEs of the monomer and dimer: the difference in RSE between the eight-membered and sixteen-membered rings might be less drastic than that between the five-membered and ten-membered rings.

The effect of concentration was also investigated. Depolymerization was studied for polymer P2a at concentrations of [olefin]=25 mM, 50 mM, 100 mM, 200 mM, 400 mM and 600 mM at 19° C. and concentrations of [olefin]=100 mM, 400 mM and 600 mM at 50° C., and for polymer P4 at concentrations of [olefin]=25 mM, 50 mM, 100 mM and 200 mM. The following procedure is a representative example of depolymerization experiments performed here: In a 1-dram vial with a stir bar, polymer P2a (60 mg, 0.238 mM, 1 eq.) was dissolved in CHCl3. To the solution was added 100 μL of a stock solution of Grubbs second-generation catalyst G2 (2.02 mg, 0.00238 mM, 0.01 eq.), such that desired concentration of polymer olefin groups was reached. The solution was divided into three vials for parallel experiments, and the vials were placed in a preheated oil bath at 50° C. and allowed to react for 2 h (12 h for room depolymerizations at room temperature), after which 100 μL EVE was added to quench the polymerization. Volatiles were removed using a rotavap and 800 μL CDCl3 was added to the residue. The depolymerization mixture was characterized with $^1$ H NMR, and the extent of depolymerization was determined by integration of the olefin peaks for the monomers (5.75 5.50 ppm) and polymer/oligomers (5.50-5.20 ppm).

The kinetics and mechanism of depolymerization were also investigated.

Depolymerization was performed at 50° C., 45° C. and 19° C. with concentration [olefin]=25 mM. The following procedure is a representative example of depolymerization experiments performed here: P2a (63.1 mg, 0.25 mmol, 1 eq.) was dissolved in 10 mL of CHCl3 in a 20 mL vial with a stir bar and placed in an oil bath preheated to 45° C. The temperature of the vial was allowed to equilibrate with the oil bath while stirring for 20-30 minutes (this step was skipped for the experiment conducted at 19° C. which was the ambient temperature), after which G2 (2.1 mg, 0.0025 mmol, 0.0025 eq.) was added and a stopwatch was started. Aliquots of 800 μL were withdrawn with a micropipette at different time intervals and added to a 3-dram vial with 100 μL EVE to quench the reaction. The volatiles were removed using a rotavap, and $^1$H NMR and GPC were performed to characterize the aliquots. The fraction of the oligomers was determined using the integration of the GPC RI trace. The area under the peaks corresponding to the cyclic oligomers (retention time 17.7 min to 19.7 min) and the total areas under the cyclic oligomer and polymer peaks (from the beginning of polymer peak to 19.7 min) in the GPC traces were calculated. The combined fractions of cyclic oligomers and polymers were calculated by integrations of the olefin peaks for the monomer (5.75-5.50 ppm) and polymer/oligomers (5.50-5.20 ppm) in $^1$H NMR.

Studies by Badamshina et al., Badamshina, E. R. et al. Investigation of the mechanism of polypentenamer degradation in the presence of metathesis catalysts. *Polym. Sci. USSR* 24, 164-170 (1982), which is incorporated herein by reference, showed that the depolymerization of polypentenamer proceeds through a random chain cleavage pathway. Recently, Kennemur and coworkers, Neary, W. J., Isais, T. A. & Kennemur, J. G. Depolymerization of bottlebrush polypentenamers and their macromolecular metamorphosis. *J. Am. Chem. Soc.* 141, 14220-14229 (2019), which is incorporated herein by reference, studied the depolymerization mechanism of a bottlebrush polypentenamer and found that the chain cleavage occurs in an end-to-end fashion. In this case, due to the steric hinderance of the side chain in the bottlebrush, the ruthenium catalyst preferentially coordinates to the terminal olefin over the internal olefin. Since there is no long side chain in the linear tCBCO polymers, it is expected that the depolymerization will proceed in a random fashion, similar to that for a linear polypentenamer.

At the early stage of depolymerization, the polymer peak shifted to a longer retention time; meanwhile, a shoulder peak that connects the polymer peak and the oligomer peaks appeared. The shoulder peak eventually disappeared along with the polymer peak. The appearance of a shoulder peak supports random chain cleavage, since a shoulder peak is not expected for the end-to-end depolymerization. In addition, end-to-end depolymerization would result in a linear reduction of molecular weight over the fraction of depolymerization; however, the plot of molecular weight against depolymerization conversion did not show a linear relationship, further suggesting that random chain cleavage occurred during the depolymerization.

Structure and RSE Relationships

Figure 3:
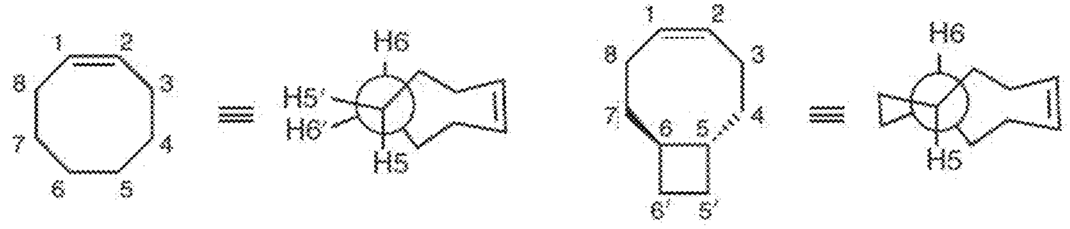
FIG. 3 provides the structures and corresponding Newman projections of cyclooctene and trans-cyclobutane-substituted cyclooctene showing the numbering scheme.
Figure 4:
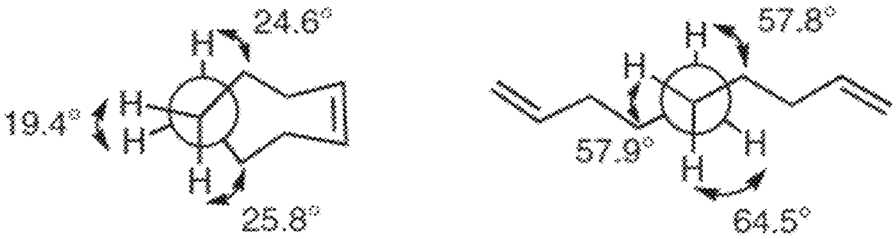
FIG. 4 provides the projections for non-substituted, trans-cyclobutane (trans-CB)-substituted and cis-cyclobutane H5-C5-C6-C7 and H6-C6-C5-C4, as well as H5'-C5-C6-C6' (for the case with no substitution) and C5'-C5-C6-C6' (for the cases involving CB substitution), are shown along with the projections.
Figure 4:
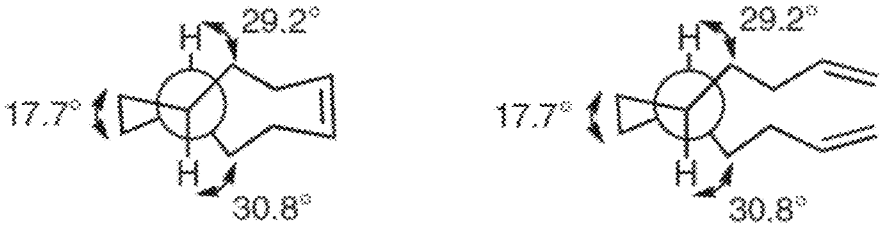
Figure 4:
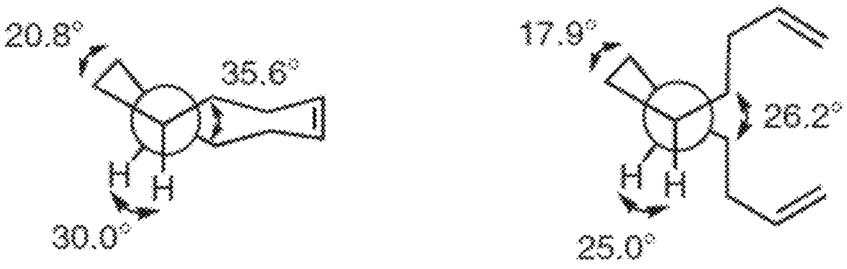
Figure 5:
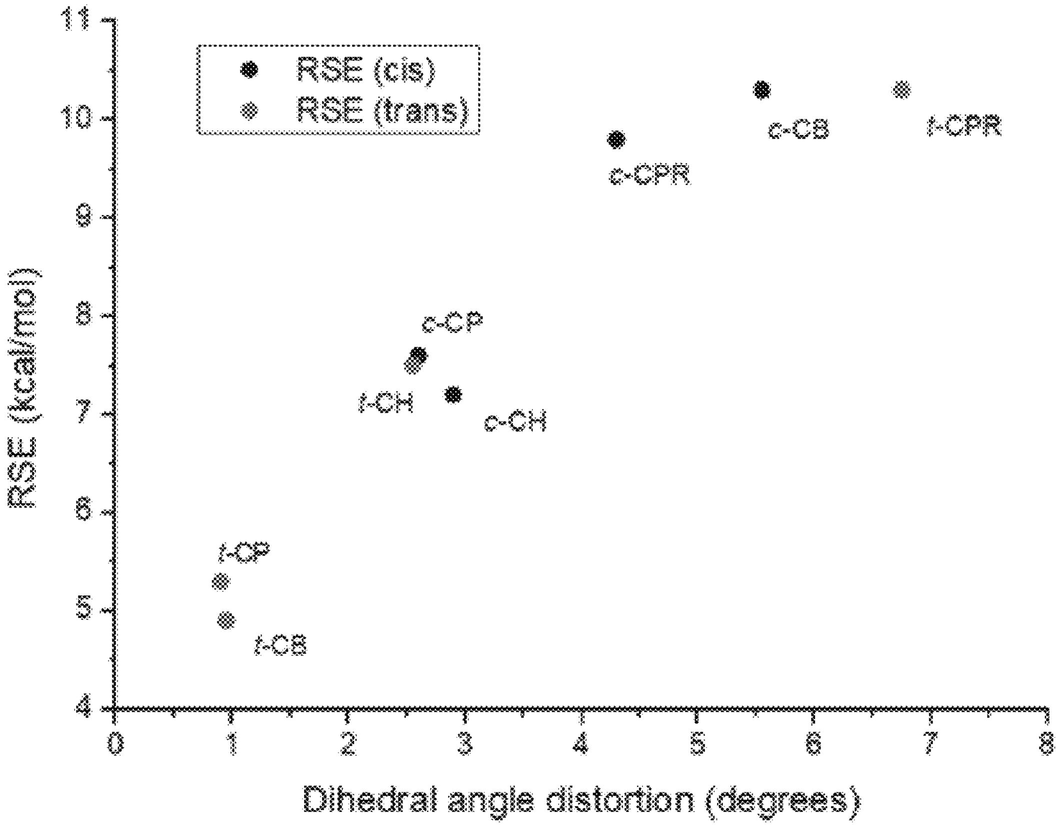
FIG. 5 provides a chart showing the correlation between the ring strain energy and the distorted dihedral angles C4-C5-C5'-C6 and C7-C6-C6'-C5 from the acyclic diene to the cycloalkane-fused cyclooctene, where the ring strain energy is plotted against the distorted dihedral angles for each cycloalkane-fused cyclooctene.

The finding that the ring strain of cyclooctene is reduced by a highly strained cyclobutene is somewhat counterintuitive. Transannular strain and torsional strain are important sources of ring strain in medium-sized (seven- to twelve-membered) rings. To assess the impact of the cyclobutane-fused ring on the transannular interaction, all of the non-bonded H—H distances on the unsubstituted cyclooctene and tCBCO were investigated. The H—H distances in show that only one notable transannular interaction is present in the unsubstituted cyclooctene: it occurs between H3a and H8a at a distance of 2.15 Å. Incorporation of a trans-cyclobutane-fused ring only slightly increases the H3a—H8a distance (2.18 Å), indicating that the transannular strain is not noticeably impacted by the trans-cyclobutane-fused ring. Since the ring strain of a cyclic molecule is the relative energy between the cyclic molecule and an acyclic reference molecule, to understand the impact of the fused rings on the ring strain, the structural difference between the cyclooctenes and the acyclic 1,9-decadienes, were investigated (the structures of which were obtained for use in the ring strain calculations) via the Newman projection along the C5-C6 bond as shown in FIG. 3 and FIG. 4. The dihedral angles H5-C5-C6-C7, H6-C6-C5-C4 and H5'-C5-C6-H6' in cyclooctene are 25.8°, 24.6° and 19.4°, respectively, generating substantial torsional strain. The torsional strain becomes negligible in the acyclic 1,9-diene, as the dihedral angles are all close to 60°. The molecule trans-cyclobutane-fused cyclooctene was examined, in which the H5' and H6' (of an unsubstituted cyclooctene) are replaced with C5' and C6'. As shown in FIG. 4, the dihedral angles H5-C5-C6-C7, H6-C6-C5-C4 and C5'-C5-C6-C6' in tCBCO are 30.8°, 29.2° and 17.7°, respectively. Notably, these dihedral angles remain identical in the corresponding acyclic diene. As a result, the relative energy between tCBCO and the corresponding acyclic diene is reduced. As for the cis-cyclobutane-fused system, while torsional strain is also present in the acyclic diene, the dihedral angles are markedly different from those in the cyclic form, indicating that the structure of cyclobutane is distorted from the acyclic to the cyclic olefin. The reduction of ring strain by maintaining the eclipsing effect in the acyclic form is therefore offset by the distortion energy in the case of cis-cyclobutane-fused cyclooctene. The compensation between these two effects can be generalized to other cycloalkane-fused cyclooctenes: while the cycloalkanes (from three- to six-membered rings) reduce the ring strain by locking the conformation of the acyclic form so that the eclipsing effect is present, the fusion of the two rings (the cycloalkane and cyclooctene) can distort the cycloalkane, which increases the ring strain. As shown in FIG. 5 the RSEs of the cycloalkane-fused cyclooctenes correlate well with the distortion of the dihedral angles C4-C5-C5'-C6 and C7-C6-C6'-C5 from the acyclic diene to cycloalkane-fused cyclooctene. The trans-cyclobutane therefore represents an ideal scenario where the torsional strain is maintained in both the cyclic and acyclic forms at a low energy cost.

Thermal and Mechanical Properties

The mild depolymerization conditions along with the excellent thermal stability ($T_d$>370° C.) of the tCBCO polymers make them appealing for use as sustainable materials. Since a wide range of $T_g$ values (from −30° C. to 100° C.) can be accessed through functionalization of the tCBCO polymers, both elastomers and plastics can be prepared. Using the monomer M2b ($T_g$ of P2b is −31° C.) and a tCBCO crosslinker XL1, an elastomer PN1 was prepared and a tensile test was conducted. The stress—strain curve showed a Young's modulus of 0.61 ±0.10 MPa, a maximum strain of 238±15% and a tensile strength of 0.61±0.10 MPa. Previous work by Moore and coworkers, Liu, H. et al. Dynamic remodeling of covalent networks via ring-opening metathesis polymerization. *ACS Macro Lett.* 7, 933-937 (2018), which is herein incorporated by reference, has shown that metathesis-based depolymerization can occur in bulk materials, suggesting that the crosslinked material here should still be depolymerizable. A depolymerization conversion of 94% was observed when PN1 was immersed in a solution of G2 in $CDCl_3$ and was heated to 50° C. for 2 h.

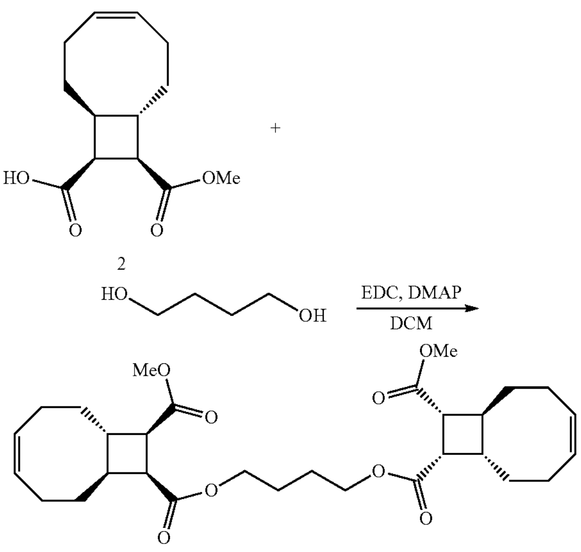

2

XL1

To a round-bottom flask equipped with a stir bar, ester-acid 2 (624.0 mg, 2.62 mmol, 1 eq.), DMAP 64.1 mg, 0.5 mmol, 0.2 eq.), butanediol (111.8 mg, 1.24 mmol, 0.47 eq.) and dry DCM (50 mL) were added. The solution was cooled over an ice bath and to this, EDC (1000 mg, 5.22 mmol, 2 eq.) was added. The mixture was allowed to warm to room temperature and stir overnight. The reaction mixture was then diluted with more DCM and washed with brine, dried over $Na_2SO_4$, filtered, and concentrated by solvent evaporation on a rotavap. The crude product mixture was purified via column chromatography, using a 3:7 EA/Hexane mixture as eluent. After solvent removal, the product XL1 was obtained as a white solid (yield: 32%).

The imide-functionalized tCBCO polymer P4 has a Tg of 100° C., which is comparable to that of polystyrene (one of the most widely used plastics). The large thermal processing window (which is above the $T_g$ but below the $T_d$) of P4 allowed the melt-pressing of films of the material. From the melt-pressed film of P4, a dog-bone specimen was prepared and tensile testing was conducted to obtain the stress—strain curve. A polystyrene sample was processed in the same manner and was subjected to tensile testing for comparison. P4 showed a Young's modulus of 1.40±0.06 GPa, which is comparable to that of polystyrene (1.56±0.12 GPa). The strain at break (3.4±0.3%) and the tensile strength (39±5 MPa) of P4 were also comparable to those of polystyrene (strain at break of 3.7±0.4% and a tensile strength of 46±1 MPa).

In principle, the tCBCO monomers can be obtained by the photochemical [2+2] cycloaddition of 1,5-cyclooctadiene with a wide variety of olefins, therefore providing numerous possibilities of functionalities and material properties. For example, this process would enable the preparation of chemically recyclable polymers using biobased olefins, therefore reducing the reliance on fossil feedstocks. Another example is the use of fluorinated olefins for preparing chemically recyclable fluorinated polymers, which are highly desirable but particularly rare. Moreover, the cis-alkene in the cyclooctene monomer can be isomerized into trans-alkene, which substantially increases the ring strain of the monomer, allowing for living polymerization. This feature (temporarily increasing the monomer ring strain to assist polymerization) makes the tCBCO system unique compared to other depolymerization systems6. The living ROMP of norbornene-derived monomers has enabled the synthesis of diverse polymer architectures and has fundamentally impacted many fields; however, the resulting polynorbornenes are not depolymerizable. The tCBCO system will allow for living ROMP that produces depolymerizable polymers. Furthermore, the concept of controlling ring strain using an additional ring—as well as the insights gained in this study on how the size and stereochemistry of the fused ring impact the ring strain—can be useful for many other fields where ring strain plays an important role, including mechanochemistry, molecular machines, catalysis and click chemistry. For example, in the strain-promoted azide—alkyne cycloaddition demonstrated by Bertozzi and coworkers, Agard, N. J., Prescher, J. A. & Bertozzi, C. R. A strain-promoted [3+2] azide—alkyne cycloaddition for covalent modification of biomolecules in living systems. *J. Am. Chem. Soc.* 126, 15046-15047 (2004), which is herein incorporated by reference the reactivity is substantially increased by the ring strain in cyclooctyne. The fused-ring strategy used here could be applied to further control the ring strain of cyclooctyne and the strain-promoted azide—alkyne cycloaddition reactivity.

Repolymerization of the Recycled Monomer

Isolation of recycled monomer and its repolymerization was also demonstrated. After treating with scavenger, the depolymerization mixture from the batch described above (146.5 mg P2a, 100 mM concentration, 1 mol % G2) was purified with column chromatography (1:4 EA/hexane) affording 121.2 mg of M2a (Yield: 82.7%). The structure matched the pure monomer as confirmed by $^1$H NMR, $^{13}$C NMR and MS. 102 mg of this monomer was polymerized as previously described (102 μL DCM, 0.002 eq. G2. The $^1$H NMR of the resulting polymer also matched that of P2a. The molecular weight information of the resulting polymer: Mn=71 kDa, Đ=1.53.

Materials and Instrumentation

Cis-2-Butene-1,4-diol, acetic anhydride and 2,2-dimethoxypropane were purchased from Alfa Aesar. 1-ethyl-3-(3-dimethylaminopropyl)carbodiimide hydrochloride (EDC) was purchased from Chem-Impex. (Z,Z)-1,5-cyclooctadiene, N-phenylmaleimide, methyltriphenylphosphonium bromide, potassium tert-butoxide, sodium acetate and aniline were purchased from TCI. Grubbs 1st and 2nd generation catalysts, benzophenone, lithium aluminum hydride, p-toluenesulfonic acid, 1,4-butanediol, ethyl vinyl ether, Quadrapure TU, sodium periodate, sodium hydride, methyl benzoate, methyl iodide and cuprous iodide were purchased from Sigma Aldrich. Maleic anhydride, 3-chloroperoxybenzoic acid, p-toluenesulfonyl chloride, sodium borohydride, triethylamine, acetic acid, silver nitrate and allylmagnesium chloride (1.7 M solution in THF) were purchased from Acros Organics. Polystyrene (Styron 663) was obtained from Dow. Unless specified, all reagents were used as received without further purification. Column chromatography was performed using Silicycle F60 (230-400 mesh) silica gel.

LaboACE LC-5060 preparatory GPC with two JAIGEL-2HR columns was used for purification where specified, with HPLC grade chloroform containing 0.75% ethanol as the eluent.

$^1$ HNMR and $^{13}$ C NMR spectra were obtained on either a Varian 300 or a 500 MHz spectrometer with $CDCl_3$ or acetone-d6 as the solvents. Single crystal data for all structures were collected on a Bruker CCD-based diffractometer with dual Cu/Mo ImuS microfocus optics (Cu Kα radiation, λ=1.54178 Å or Mo Kα radiation, λ=0.71073). Crystals were mounted on a cryoloop using Paratone oil and placed under a steam of nitrogen at 100 K (Oxford Cryosystems). The data were corrected for absorption with the SADABS program. The structures were refined using Bruker SHELXTL Software Package (Version 6.1) and were solved using direct methods until the final anisotropic full-matrix least squares refinement of F2 converged. Electronic Supplementary Information (ESI) available: CCDC 2032007-2032009 contains the supplementary crystallographic data for this paper. These data can be obtained free of charge from The Cambridge Crystallographic Data Centre via www. ccdc. cam. ac.uk/data_request/cif.

High resolution mass spectra (HRMS) were performed on Waters Synapt HDMS Quadrupole/Time-of-Flight (Q-ToF) Mass Spectrometer (Waters, Beverly, MA) in positive ion mode.

Gel permeation chromatography (GPC) was carried out with a Tosoh EcoSEC HLC-8320GPC Quad Detector with two 17393 TSKgel columns (7.8 mm ID×30 cm, 13 μm) and one 17367-TSKgel Guard Column (7.5 mm ID×7.5 cm, 13 μm).

Thermal properties were determined using a TA Discovery DSC 250 and TGA 550. Tensile testing was performed using an Instron 5969 tensile tester or using a home-built tensile tester with a 10 kg load cell controlled by an Arduino UNO.

In light of the foregoing, it should be appreciated that the present invention significantly advances the art by providing a monomer capable of forming a polymer through ring-opening metathesis polymerization and capable of depolymerization thereafter through ring-closing metathesis that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A monomer capable of forming a polymer through ring-opening metathesis polymerization and capable of depolymerization thereafter through ring-closing metathesis, the monomer comprising:

a cycloalkene having a fused ring attached thereto which decreases the ring strain energy to 5.3 kcal/mol or lower as compared to the same cycloalkene without a fused ring having a ring strain energy above 5.3 kcal/mol.

2. The monomer of claim 1, wherein the cycloalkene is a 7- to 12-membered cycloalkene.

3. The monomer of claim 1, wherein the fused ring is either cis-fused or transfused.

4. The monomer of claim 2, wherein the cycloalkene is an 8-membered cycloalkene, cyclooctene.

5. The monomer of claim 1, wherein the fused ring is a 3- to 6-membered ring.

6. The monomer of claim 5, wherein the fused ring is a 4-membered ring, cyclobutane.

7. The monomer of claim 5, wherein the fused ring is a 5-membered ring, cyclopentane.

8. The monomer of claim 4, wherein the fused ring is fused at the C5, C6-positions of the cyclooctene.

9. The monomer of claim 8, wherein the fused ring is trans-cyclobutane or trans-cyclopentane.

10. A monomer forming a polymer through ring-opening metathesis polymerization and capable of depolymerization thereafter through ring-closing metathesis, the monomer comprising:

a cycloalkene having a fused ring attached thereto wherein the attachment of the fused ring results in a change of less than 1° of an average difference in dihedral angles from a corresponding acyclic diene of the cycloalkene having a fused ring attached thereto, as measured at the attachment of the fused ring.

11. The monomer of claim 10, wherein the cycloalkene is a 7- to 12-membered cycloalkene.

12. The monomer of claim 10, wherein the fused ring is either cis-fused or transfused.

13. The monomer of claim 11, wherein the cycloalkene is an 8-membered cycloalkene, cyclooctene.

14. The monomer of claim 10, wherein the fused ring is a 3- to 6-membered ring.

15. The monomer of claim 14, wherein the fused ring is a 4-membered ring, cyclobutane.

16. The monomer of claim 14, wherein the fused ring is a 5-membered ring, cyclopentane.

17. The monomer of claim 13, wherein the fused ring is fused at the C5, C6-positions of the cyclooctene.

18. The monomer of claim 17, wherein the fused ring is trans-cyclobutane or trans-cyclopentane.

19. A method of synthesizing a monomer capable of forming a polymer through ring-opening metathesis polymerization and capable of depolymerization thereafter through ring-closing metathesis, the method comprising:

i. providing a cyclic diene;

ii. performing a photochemical 2+2 cycloaddition with an olefin to the cyclic diene.

* * * * *